United States Patent
Carapelli et al.

(10) Patent No.: US 9,887,845 B2
(45) Date of Patent: Feb. 6, 2018

(54) CRYPTOGRAPHIC WATERMARKING OF CONTENT IN FUEL DISPENSING ENVIRONMENTS

(71) Applicant: GILBARCO INC., Greensboro, NC (US)

(72) Inventors: Giovanni Carapelli, High Point, NC (US); Bruce Welch, Steinhatchee, FL (US)

(73) Assignee: Gilbarco, Greensboro, NC (US)

( * ) Notice: Subject to any disclaimer, the term of this patent is extended or adjusted under 35 U.S.C. 154(b) by 0 days.

(21) Appl. No.: 14/528,585

(22) Filed: Oct. 30, 2014

(65) Prior Publication Data

US 2015/0121082 A1 Apr. 30, 2015

Related U.S. Application Data

(60) Provisional application No. 61/897,368, filed on Oct. 30, 2013.

(51) Int. Cl.
| | | |
|---|---|---|
| *H04L 9/32* | (2006.01) | |
| *G09C 5/00* | (2006.01) | |
| *H04N 21/44* | (2011.01) | |
| *H04N 21/4627* | (2011.01) | |
| *H04N 21/8358* | (2011.01) | |

(52) U.S. Cl.
CPC .............. *H04L 9/32* (2013.01); *G09C 5/00* (2013.01); *H04L 9/3247* (2013.01); *H04N 21/44008* (2013.01); *H04N 21/4627* (2013.01); *H04N 21/8358* (2013.01); *G06F 2221/0733* (2013.01); *H04L 2209/608* (2013.01)

(58) Field of Classification Search
USPC ............ 713/194, 176; 726/34; 345/168, 520
See application file for complete search history.

(56) References Cited

U.S. PATENT DOCUMENTS

| | | | |
|---|---|---|---|
| 4,200,770 A | 4/1980 | Hellman et al. | |
| 4,405,829 A | 9/1983 | Rivest et al. | |
| 4,797,920 A | 1/1989 | Stein | |
| 5,228,084 A | 7/1993 | Johnson et al. | |

(Continued)

FOREIGN PATENT DOCUMENTS

| | | |
|---|---|---|
| EP | 1408459 A1 | 4/2004 |
| EP | 1770586 A1 | 4/2007 |
| WO | 2010142748 A1 | 12/2010 |

OTHER PUBLICATIONS

International Search Report and Written Opinion dated Feb. 3, 2015 in corresponding international application No. PCT/US2014/063165, all enclosed pages cited.

(Continued)

*Primary Examiner* — Brandon Hoffman
*Assistant Examiner* — Samuel Ambaye
(74) *Attorney, Agent, or Firm* — Nelson Mullins Riley & Scarborough, LLP

(57) ABSTRACT

Systems and methods for watermarking content and authenticating watermarked content are provided. Content is rendered on a display while watermarking information embedded in portions of the content are obtained. The watermarking information is verified to authenticate the content. If the content is not authentic, or is not authenticated within a period of time, the content can be terminated or otherwise blocked from rendering on the display.

13 Claims, 10 Drawing Sheets

(56) References Cited

U.S. PATENT DOCUMENTS

| | | |
|---|---|---|
| 5,493,613 A | 2/1996 | Denno et al. |
| 5,790,410 A | 8/1998 | Warn et al. |
| 5,832,206 A | 11/1998 | De Jesus et al. |
| 5,889,863 A | 3/1999 | Weber |
| 5,996,076 A | 11/1999 | Rowney et al. |
| 6,026,492 A | 2/2000 | Cromer et al. |
| 6,115,819 A | 9/2000 | Anderson |
| 6,185,307 B1 | 2/2001 | Johnson, Jr. |
| 6,199,105 B1 | 3/2001 | Soejima et al. |
| 6,226,749 B1 | 5/2001 | Carloganu et al. |
| 6,360,138 B1 | 3/2002 | Coppola et al. |
| 6,442,448 B1 | 8/2002 | Finley et al. |
| 6,577,734 B1 | 6/2003 | Etzel et al. |
| 6,630,928 B1 | 10/2003 | McIntyre et al. |
| 6,736,313 B1 | 5/2004 | Dickson |
| 6,789,733 B2 | 9/2004 | Terranova et al. |
| 7,047,223 B2 | 5/2006 | Watlington |
| 7,054,829 B2 | 5/2006 | Campo et al. |
| 7,215,775 B2 | 5/2007 | Noguchi et al. |
| 7,370,200 B2 | 5/2008 | Kindberg et al. |
| 7,607,576 B2 | 10/2009 | Robertson et al. |
| 7,953,968 B2 | 5/2011 | Robertson et al. |
| 8,392,846 B2 | 3/2013 | Carapelli |
| 8,558,685 B2 | 10/2013 | Long et al. |
| 2002/0026575 A1 | 2/2002 | Wheeler et al. |
| 2002/0066020 A1 | 5/2002 | Whytock |
| 2002/0124170 A1 | 9/2002 | Johnson, Jr. |
| 2002/0138554 A1 | 9/2002 | Feigen et al. |
| 2002/0153424 A1 | 10/2002 | Li |
| 2002/0157003 A1 | 10/2002 | Beletski |
| 2002/0191029 A1 | 12/2002 | Gillespie et al. |
| 2003/0002667 A1 | 1/2003 | Gougeon et al. |
| 2003/0030720 A1 | 2/2003 | Hutchings |
| 2003/0055738 A1 | 3/2003 | Alie |
| 2003/0103645 A1* | 6/2003 | Levy ................. G06F 17/30876 382/100 |
| 2003/0194071 A1 | 10/2003 | Ramian |
| 2004/0015958 A1 | 1/2004 | Veil et al. |
| 2004/0172339 A1 | 9/2004 | Snelgrove et al. |
| 2005/0145690 A1 | 7/2005 | Shibasaki |
| 2005/0278533 A1 | 12/2005 | Mayer |
| 2006/0074766 A1 | 4/2006 | Pfleging et al. |
| 2006/0089145 A1 | 4/2006 | Chen et al. |
| 2006/0179323 A1 | 8/2006 | Nei |
| 2007/0033398 A1 | 2/2007 | Robertson et al. |
| 2007/0255966 A1 | 11/2007 | Condorelli et al. |
| 2008/0120191 A1 | 5/2008 | Long |
| 2008/0134345 A1* | 6/2008 | Epstein ................. H04N 5/913 726/28 |
| 2008/0162938 A1 | 7/2008 | Struik |
| 2008/0228575 A1* | 9/2008 | Silberstein ............. G06Q 30/02 705/14.47 |
| 2009/0089579 A1 | 4/2009 | Murase et al. |
| 2009/0222673 A1 | 9/2009 | Schneck et al. |
| 2009/0265638 A1 | 10/2009 | Carapelli et al. |
| 2010/0027837 A1 | 2/2010 | Levy et al. |
| 2010/0169652 A1* | 7/2010 | Butler ................. G06T 1/0021 713/176 |
| 2010/0230437 A1 | 9/2010 | Carapelli |
| 2010/0268612 A1 | 10/2010 | Berrio et al. |
| 2011/0047081 A1 | 2/2011 | Kelly et al. |
| 2011/0099279 A1 | 4/2011 | Hooper et al. |
| 2011/0134044 A1 | 6/2011 | Carapelli |
| 2011/0185319 A1 | 7/2011 | Carapelli |
| 2011/0199308 A1 | 8/2011 | Nativel et al. |
| 2011/0231648 A1 | 9/2011 | Robertson et al. |
| 2011/0238511 A1 | 9/2011 | Park et al. |
| 2012/0059694 A1 | 3/2012 | Kuebert et al. |
| 2012/0060036 A1* | 3/2012 | Hamid ............... G06Q 20/3223 713/176 |
| 2012/0166343 A1 | 6/2012 | Carapelli et al. |
| 2012/0286760 A1 | 11/2012 | Carapelli et al. |
| 2012/0303531 A1 | 11/2012 | Betancourt |
| 2013/0103190 A1 | 4/2013 | Carapelli |
| 2013/0117571 A1 | 5/2013 | Petrovic et al. |
| 2013/0185214 A1 | 7/2013 | Azen et al. |
| 2013/0246171 A1 | 9/2013 | Carapelli |
| 2013/0259228 A1 | 10/2013 | Ren et al. |
| 2013/0300453 A1 | 11/2013 | Carapelli et al. |
| 2014/0337234 A1* | 11/2014 | Tang ..................... H04L 9/3265 705/71 |

OTHER PUBLICATIONS

Gilbarco: SMARTConnect, from http://www.gilbarco.com/ind_product.cfm?ContentItemID=185, all enclosed pages cited.
"Smart Connect" Product Brochureby Gilbarco Veeder-Root, copyright 2004 Gilbarc Inc., all enclosed pages cited.
Chapter 7 of Book 4 of Version 4.1 of the Europay MasterCard Visa ("EMV") standard for Integrated Circuit Card Specifications for Payment Systems (May 2004), all enclosed pages cited.
"Payment Card Industry ("PCI") PIN Entry Device Testing and Approval Program Guide," Version 4.0, Visa Public, Sep. 2004, all enclosed pages cited.
"TFT Color LCD Module: Type NL6448CC33-30W 26cm (10.4 Type), VGA, Specifications" 4th ed., NEC Corporation, Jul. 13, 2000, all enclosed pages cited.
"Payment Card Industry ("PCI"): POS PIN Entry Device Security Requirements Manual," Version 1.2, Sep. 2004, all enclosed pages cited.
"PCI POS PED Evaluation FAQ (Technical)," Sep. 21, 2004, all enclosed pages cited.
"Authenticated Content Signing for Symbian" Internet Citation, Mar. 8, 2005 retrieved from http://web.archive.org/web/20050308164449/www.verisign.com/products-services/security-services/code-signing/symbian-content-signing/index.html (retrieved on Feb. 7, 2006), all enclosed pages cited.
Extended European Search Report dated May 4, 2017 in corresponding European Application No. EP 14858731, all enclosed pages cited.

* cited by examiner

CRYPTOGRAPHIC WATERMARKING OF CONTENT IN FUEL DISPENSING ENVIRONMENTS

PRIORITY CLAIM

This application is based upon and claims the benefit of U.S. provisional application Ser. No. 61/897,368, filed Oct. 30, 2013, which is incorporated fully herein for all purposes.

TECHNICAL FIELD

The subject matter described herein relates generally to fuel dispensers, and more specifically to managing content employed by fuel dispensers.

BACKGROUND

Retail fueling dispensers offer inputs for customer data in routine and specific manners, such as answering of scripted yes/no questions, credit card swiping, postal ("zip") code entry, etc. While this facilitates control over reception and further communication of the customer data, the dispensers are unable to utilize different business applications or services desired by retail merchants for possibly increasing revenue, maintaining loyalty, and offering a unique user experience while maintaining or guaranteeing a level of security mandated by governing bodies, such as payment card industry (PCI) security counsel, Europay, Mastercard, Visa (EMV), etc. Introduction of such applications or services at the fuel dispensers may compromise security of customer data due to the ability of such applications or services to possibly access the same inputs currently utilized at the dispensers for payment or other transactions.

In this regard, authentication of content at a fuel dispenser, which may include applications or services for executing on the fuel dispenser, media for rendering by the fuel dispenser, etc., may be desired to allow control over which content can be displayed, executed, etc. Authentication can be performed before execution or presentation by allowing only applications or services signed by specified entities to execute or present on the fuel dispenser. In particular, components of the fuel dispenser are configured to verify a signature of content uploaded thereto against one or a database of allowed signatures before permitting execution. The fuel dispenser typically requires content to be signed by a signature of the manufacturer in order to execute on the fuel dispenser. Thus, the manufacturer is responsible for reviewing and testing third-party applications developed for the fuel dispenser to ensure proper functionality, proper security, etc., and signing the content for use on the fuel dispenser. When content is signed before execution, however, each device or related processor(s) desiring to execute or present the content must verify the signature before proceeding. This can be burdensome for processors that are not concerned with securing of the content, or otherwise may not hold information necessary to verify the signatures.

SUMMARY

The following presents a simplified summary of one or more aspects to provide a basic understanding thereof. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

Aspects described herein are directed to using cryptographic watermarking for content executed or otherwise rendered on a device during the execution or rendering in authenticating the content. If the watermarking is not authentic, or is not authenticated within a certain time period for example, the content can be terminated or otherwise blocked from being presented. For example, watermarking description information for certain content can be provided to a device that verifies watermarking for content, and the device can determine whether the content is appropriately watermarked while the content is being rendered or executed. For example, the watermarking can include placing watermarking information in one or more frames of content (e.g., where the content relates to video) such that the watermarking is verified as the frames are displayed. When the content cannot be verified, the content can be blocked or terminated, though rendering or execution may have begun. In this regard, the determination of whether to authenticate the content is at the processor level, and thus the content can be rendered with or without authentication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations may denote like elements, and in which.

DETAILED DESCRIPTION

Figure 1:
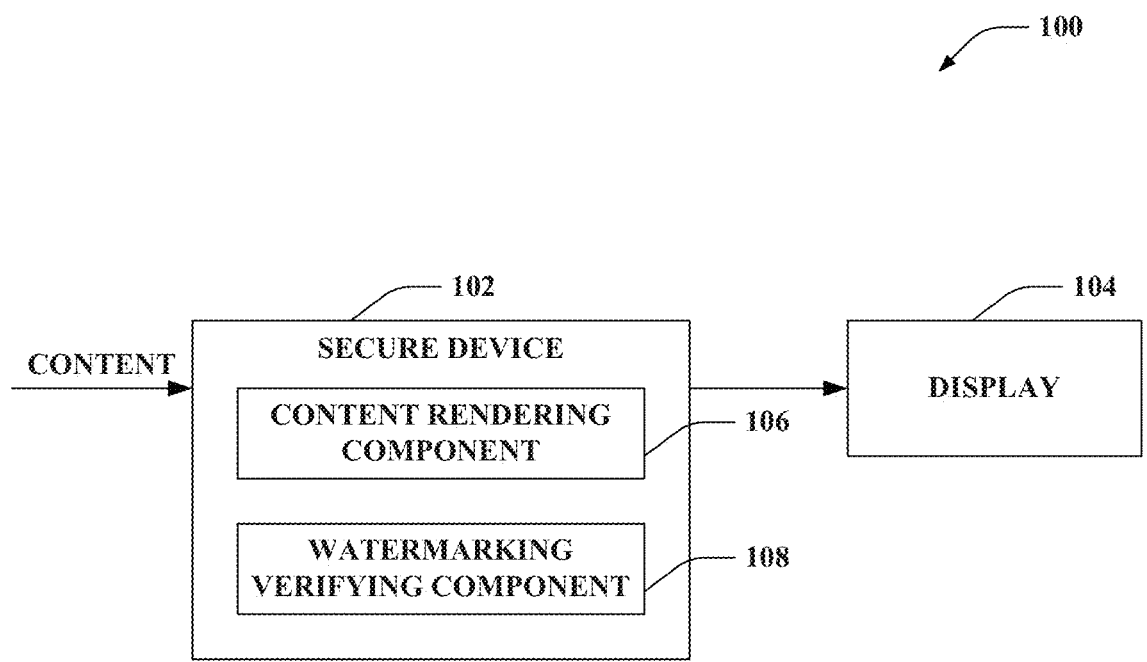
FIG. 1 is an aspect of an example system for verifying watermarking information on rendered content.

Reference will now be made in detail to various aspects, one or more examples of which are illustrated in the accompanying drawings. Each example is provided by way of explanation, and not limitation of the aspects. In fact, it will be apparent to those skilled in the art that modifications and variations can be made in the described aspects without departing from the scope or spirit thereof. For instance, features illustrated or described as part of one example may be used on another example to yield a still further example. Thus, it is intended that the described aspects cover such modifications and variations as come within the scope of the appended claims and their equivalents.

Described herein are various aspects relating to watermarking content with authentication information to allow for determining authenticity during content rendering or execution. In this regard, the content can include certain watermarking information, which can include replacing certain portions of the content with the watermarking information (e.g., replacing pixels in one or more video frames with watermarking information). In addition, in this regard, watermarking description information can be provided for the content as well that indicates a location of the watermarking information with respect to the content. Moreover, in an example, the watermarking description information can include a description of the watermarking values or parameters for verifying the watermarking to authenticate the content. In this regard, a device can obtain the watermarking description information, determine the watermarking information from the content (while the content is being rendered or executed by the device, or a related device) based on the watermarking description information, and authenticate the content based on the watermarking information. Where the content is authenticated, the device, or a related device, can continue to render or execute the content. Where the content is not authenticated, or is not authenticated after a period of time, the device, or a related device, can block or otherwise terminate rendering or execution of the content.

As used in this application, the terms "component," "module," "system," "device" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, the subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it is to be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the subject matter.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example system 100 for authenticating content for executing or rendering based on watermarking in the content. System 100 includes a secure device 102 that renders content on a display 104. One skilled in the art will recognize that the term "secure device," in the context of electronic payment systems, can generally refer to a device where is not possible to access 'secrets' (such as cryptographic keys and/or "PIN" codes . . . ) that are kept inside the device. Any attempt to tamper with a secure device can result into erasing the secrets before they can be obtained. Such anti-tampering mechanisms in the secure device can be based on some reactive electronics able to monitor dismounting switches, mesh circuits, etc. to detect tampering and accordingly take appropriate action to erase or otherwise disable the memory where the secrets are stored. In an example, secure devices can include devices compliant with payment card industry (PCI) payment transaction security (PTS) or other standards and/or governing entity specifications.

The display 104, for example, can include substantially any video output device, such as a liquid-crystal display (LCD), light-emitting diode (LED), and/or similar devices. In addition, the display 104 may have touch input functionality to allow interaction with content rendered on the display 104. In this regard, secure device 102 can authenticate content rendered on display 104 such that presentation of rogue content (e.g., unauthorized content that requests input of confidential information) can be mitigated.

Secure device 102 can include a content rendering component 106 for providing content for rendering on display 104 or for otherwise executing content that requests use of display 104 for rendering images, video, etc. Secure device 102 can also include a watermarking verifying component 108 for obtaining watermarking information from the content, and determining whether the content can be authenticated based on the watermarking information. Moreover, for example, the secure device 102 can include one or more processors for executing one or more instructions related to the content, related to communicating with other devices, such as display 104, etc.

According to an example, secure device 102 can receive content for executing or rendering. The content can be an application or service for executing on the secure device 102, media for presenting by the secure device—e.g., via display 104—and/or the like. Where the content includes an application or service, the application or service can cause media to be rendered on display 104, in an example. Such media can also be generally referred to herein as content. In any case, as content is received, content rendering component 106 can execute or otherwise render the content. This can include rendering the content on display 104, executing the content which requests media be rendered on display 104, etc. The content or other media can include video or image data, and the video or image data can have watermarking information present in one or more frames.

Thus, watermarking verifying component 108 can determine the watermarking information from the content as the content is being rendered to display 104. For example, watermarking verifying component 108 can detect certain characteristics of the content before or as it is being sent to display 104 (e.g., at one or more communication layers). In one example, watermarking verifying component 108 can obtain rendered data in a communication link between secure device 102 and display 104, and can obtain the watermarking information from the rendered data. For example, where the content includes video data, content rendering component 106 can render the video on display 104, and watermarking verifying component 108 can obtain watermarking information from certain portions of the rendered video, such as one or more frames, pixels within frames, etc.

In this regard, for example, watermarking verifying component 108 can obtain watermarking description information for the content, which can specify a description of the watermark values in the watermark information, locations within the rendered content that include the watermarking information, etc. In addition, the watermarking verifying component 108 can receive information related to authenticity of the watermarking. Thus, the watermarking verifying component 108 can obtain watermarking information from the rendered content based on received watermarking description information, and can verify the watermarking information with the received information related to authenticity of the watermarking. If watermarking verifying component 108 can authenticate the watermarking information, content rendering component 106 can continue to render content to display 104. If, however, watermarking verifying component 108 cannot authenticate the watermarking information (or cannot do so within a certain period of time), content rendering component 106 can block or otherwise terminate content rendered to display 104.

In one example, as described further herein, content rendering component 106 and/or watermarking verifying component 108 (and/or the functions thereof) can be implemented in an integrated circuit (IC), such as a field programmable gate array (FPGA) or other circuit. The IC can control a hardware switch to the display 104 to ensure that only authenticated content is rendered on display 104 (e.g., at least after a timeout period by which authenticity needs to be verified).

Figure 2:
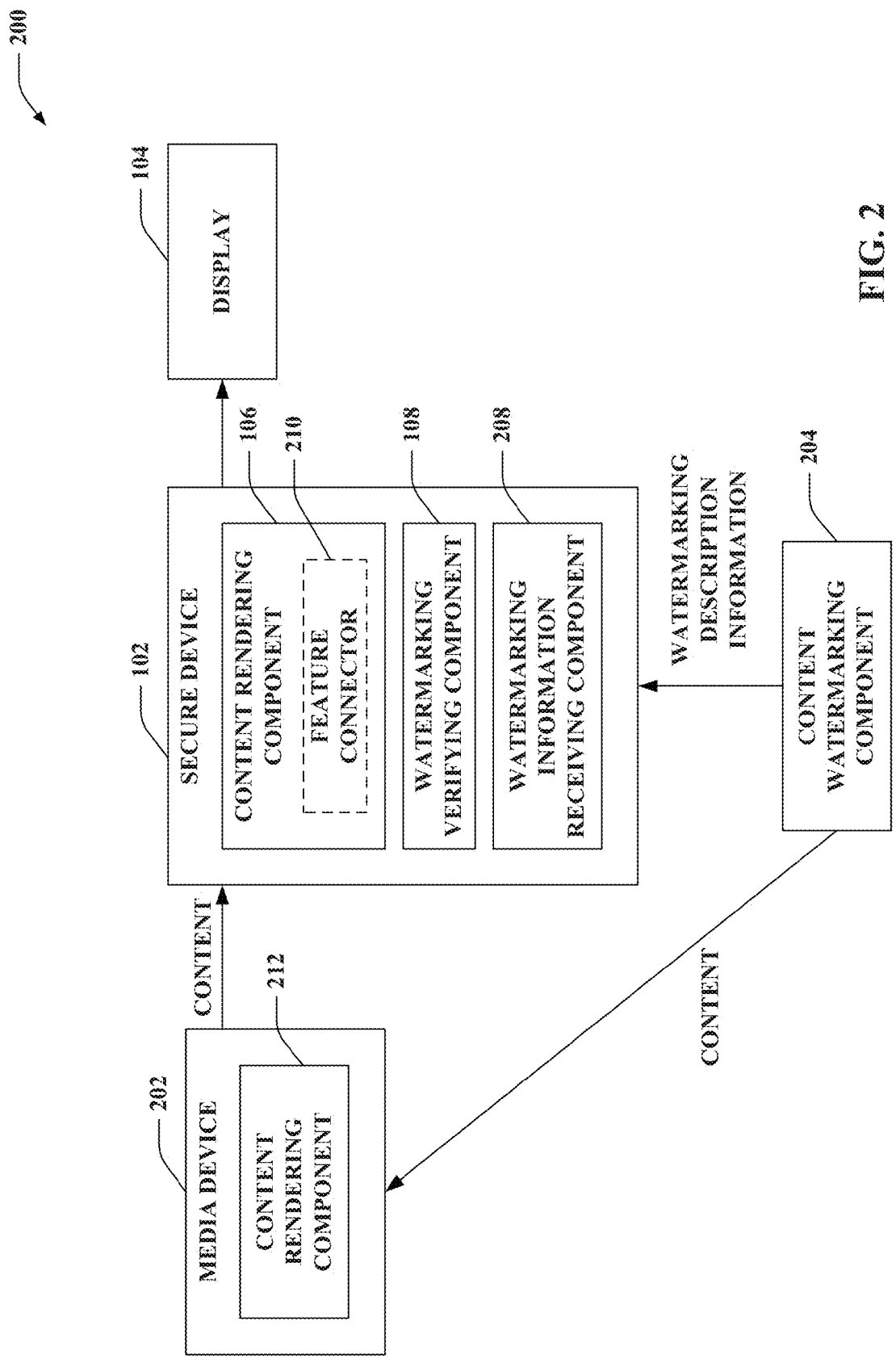
FIG. 2 is an aspect of an example system for rendering watermarked content and verifying authenticity of the watermarked content.

FIG. 2 illustrates an example system 200 for using watermarking to authenticate content for rendering on a display. System 200 includes a secure device 102 that renders content on a display 104, as described, and a media device 202 that can provide the content to secure device 102. Secure device 102 and media device 202 can be or can include one or more processors configured to perform the functionalities of these devices and/or related components, as described herein. System 200 also includes a content watermarking component 204 for watermarking content executed by media device 202. For example, content watermarking component 204 can provide content to the media device 202 and watermarking description information to secure device 102 (e.g., at request of the associated devices 202 and 102 or otherwise). In another example, content watermarking component 204 can store the content and/or watermarking description information in one or more centralized data stores for accessing by the associated devices 202 and 102.

Secure device 102 includes a content rendering component 106 and watermarking verifying component 108, as described, and also includes a watermarking information receiving component 208 for receiving watermarking description information for certain content. Content rendering component 106 may include a feature connector 210 that manages a connection with display 104. The feature connector 210 can be a hardware switch, in one example, that can be activated to allow communication between secure device 102 and a display or other output component, or deactivated to prevent access to the display or other output component. A suitable feature connector is described in U.S. Pub. App. No. 20090265638, incorporated herein by reference in its entirety for all purposes. In addition, media device 202 can include a content rendering component 212 to provide content to secure device 102 for rendering on display 104.

According to an example, content rendering component 212 can render content to be displayed on display 104. For example, the content can be rendered from an application executing on media device 202, and media device 202 can provide the content to secure device 102 for rendering on display 104. Secure device 102 can authenticate the content while rendering the content to display 104 to determine whether to allow the content to continue rendering on display 104. This can prevent malicious or rogue applications from compromising display 104 to obtain confidential information. For example, content rendering component 106 can begin rendering content to display 104, as received from media device 202. In one example, this can include switching the feature connector 210 to allow communication from the content rendering component 106 to display 104.

As content from media device 202 is received and rendered by content rendering component 106 to display 104, watermarking verifying component 108 can obtain watermarking information embedded within the content. For example, where the content is video, certain frames and/or certain pixels or collections of pixels within the frames can include watermarking information. In one example, watermarking verifying component 108 can use watermarking description information received for the content to determine a location of the watermarking information within the content (e.g., location information of pixels in certain frames that correlate to the watermarking, such as line and position parameters, and/or the like), a description of the watermark values in the watermark information, etc. Watermarking verifying component 108 can obtain the watermarking information and use the information to authenticate the content. For example, watermarking verifying component 108 can compare the watermarking information to received watermarking information, apply a function to the watermarking information to obtain an output that can be authenticated or otherwise verified, and/or the like.

It is to be appreciated, in one example, that the content is video (e.g., audio/video interleave (AVI), moving picture experts group (MPEG), etc.). Where the content type is compressed, such as MPEG video, the watermarking information can be embedded in the compressed data based on locations specified in watermarking description information. For example, watermarking verifying component 108 can extract the watermarking information from the compressed video content according to MPEG specifications given locations or other instructions/parameters in the watermarking description information. In this regard, the watermarking verifying component 108 may uncompress data extracted from the MPEG content to determine the watermarking information.

Where watermarking verifying component 108 authenticates the content based on the watermark, content rendering component 106 continues to render the content from media device 202 to display 104. Where watermarking verifying component 108 does not properly authenticate the content, content rendering component 106 can terminate or otherwise block the content from media device 202. In one example, blocking the content can include switching the feature connector 210 to disable communication between content rendering component 106 and display 104. For example, watermarking verifying component 108 can terminate or otherwise block content from reaching the display 104 where the watermarking information is obtained, but cannot be authenticated, where the watermarking information is not properly obtained within a given time period, and/or the like. It is to be appreciated that the watermarking information within the content may be rendered on display 104 as received (e.g., as modified pixel values with no relation to surrounding pixels).

In addition, in an example, content watermarking component 204 can watermark content received from one or more sources. The watermarking process performed by the content watermarking component 204, which is described further herein, can include generating watermarking information, and embedding the watermarking information within the content. Content watermarking component 204 can further generate watermarking description information, which can indicate a description of the watermarking values, a location of the watermarking information within the content, etc. The watermarking description information may also include, in an example, data related to verifying authenticity of the application based on obtaining the watermarking information. Content watermarking component 204 can provide the watermarked content to media device 202 and the watermarking description information to secure device 102. In one example, the watermarked content and related information can be provided to the devices 202 and 102 upon request. In another example, content watermarking component 204 can store the watermarked content and related watermarking description information in databases that can be accessed by media device 202 and/or secure device 102.

Furthermore, in an example, the content watermarking component 204 can encrypt the watermarking description information for storing and/or providing to the secure device 102, which can decrypt the watermarking description information. For example, the encryption/decryption information can be provided by a manufacturer or developer of the content (e.g., a private key or public/private key pair) such that the secure device 102 can authenticate the watermarking description information as being from the manufacturer or developer related to the content. Moreover, the watermarking information embedded in the content can be a digital signature of the manufacturer or developer, which can be obtained and verified by the secure device 102, as described, to authenticate the content as being from the manufacturer or developer.

In any case, watermarking information receiving component 208 can obtain the watermarking description information for locating the watermarking information in the watermarked content. Where the watermarking description information is encrypted by the content watermarking component 204, watermarking information receiving component can decrypt the watermarking description information. In an example, secure device 102 can be programmed with encryption/decryption keys by the manufacturer, and the manufacturer can also manage content watermarking component 204. In this regard, content watermarking component 204 can encrypt the watermark description information using keys related to secure device 102. Moreover, as described further herein, watermarking information receiving component 208 can communicate with content watermarking component 204 to receive the watermarking description information over a secure communication link.

Figure 3:
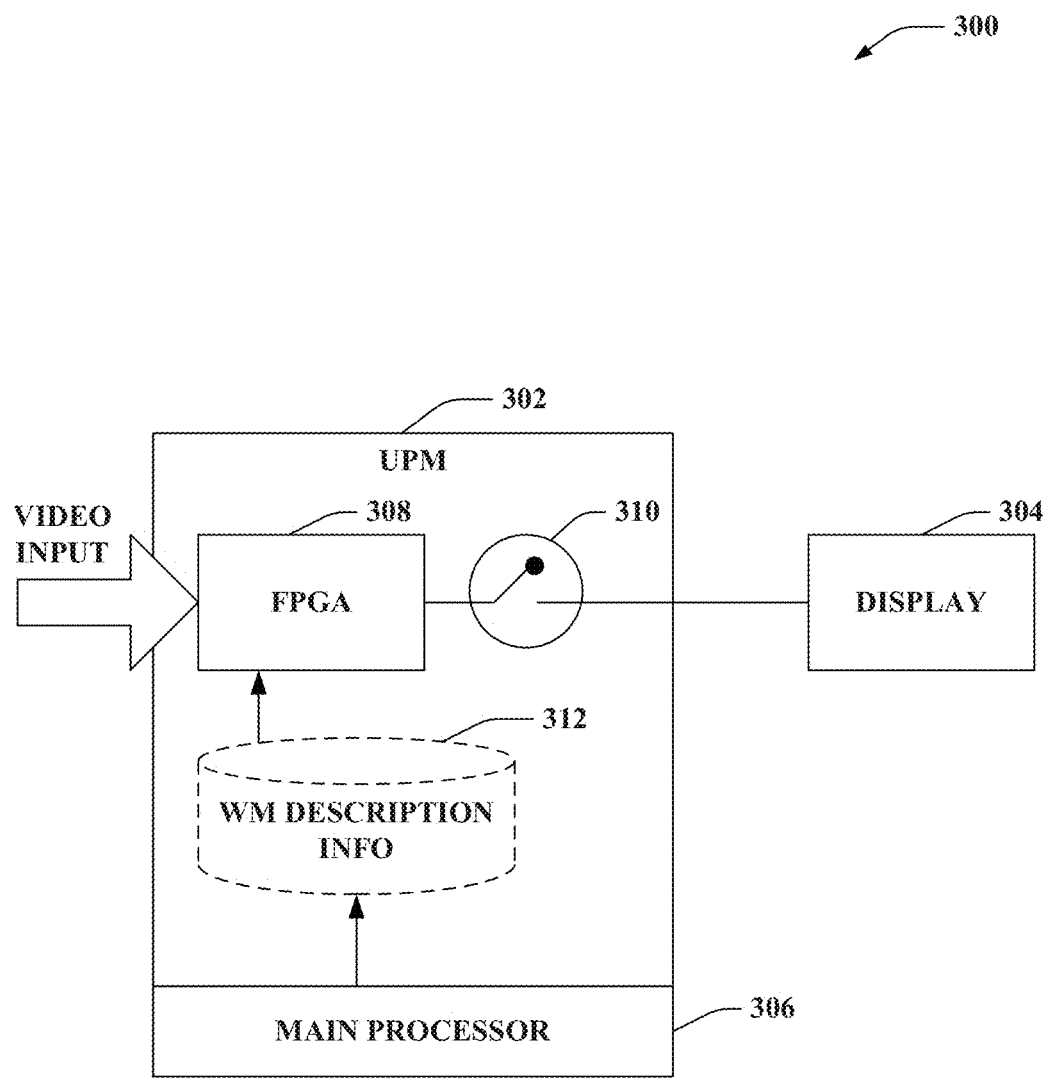
FIG. 3 is an aspect of an example system for rendering content at a universal payment module.

FIG. 3 illustrates an example system 300 for authenticating watermarked content. System 300 includes a universal payment module (UPM) 302, which can be part of a secure payment system at a retail device, such as a point-of-sale (POS) terminal, and a display 304 for rendering content from the UPM 302. The UPM 302 can be installed in a fuel dispenser or other vending machine, in one example, and can display content on display 304 relating to a current transaction, relating to an advertisement, relating to items for sale in a convenience store, and/or the like. For example, the UPM 302 can render video to display 304 over low-voltage different signaling (LVDS) or similar digital video transmission formats or display control formats. In addition, display 304 can be a touch-screen display that can obtain user input through interaction with the display 304. UPM 302 can include a main processor 306 for performing operations related to processing payment for transactions or other functions. UPM 302 can also include FPGA 308 programmed with functionality of a secure device 102, as described herein, and/or related components (e.g., content rendering component 106, watermarking verifying component 108, watermarking information receiving component 208, etc.). UPM 302 also includes a feature connector 310 that can be used to disable access to display 304, and watermarking (WM) description information 312 stored in a memory of the UPM.

According to an example, UPM 302 can be in a state for which it requires authentication of content (e.g., by authenticating the watermarking information). In one example, UPM 302 can enter such a state when entry of personal identification number (PIN) code entry for a payment card or input of other confidential information is requested by the payment application or otherwise detected by UPM 302. FPGA 308 can be instructed by main processor 306 to perform the functions of the secure device 102, as described above. In this regard, main processor 306 can instruct the FPGA 308 to identify watermarking information in received video input. For example, main processor 306 can specify a location within the video input for FPGA 308 to obtain the watermarking information, such as a frame number, positions in the frame, etc., by specifying in WM description info 312 for the video input. In addition, main processor 306 can provide expected values of the watermarking information to FPGA 308 for verifying the obtained watermarking information in the WM description info 312. As described, for example, main processor 306 can obtain at least a portion of the WM description info 312 as watermarking description information from content watermarking (e.g., from a content watermarking component or other device).

If the FPGA 308 does not detect the expected values in the video input based on the WM description info 312 or is otherwise unable to authenticate obtained watermarking information, FPGA 308 can disable the feature connector 310 such that access is not allowed between the FPGA 308 and display 304 for rendering the received video input. In one example, the FPGA 308 can disable the feature connector 310 after an amount of time has expired for verifying authenticity. If the FPGA 308 is able to authenticate the video input (e.g., based on detecting expected values for the watermarking information), the feature connector 310 can remain activated to continue video rendering on display 304.

Figure 4:
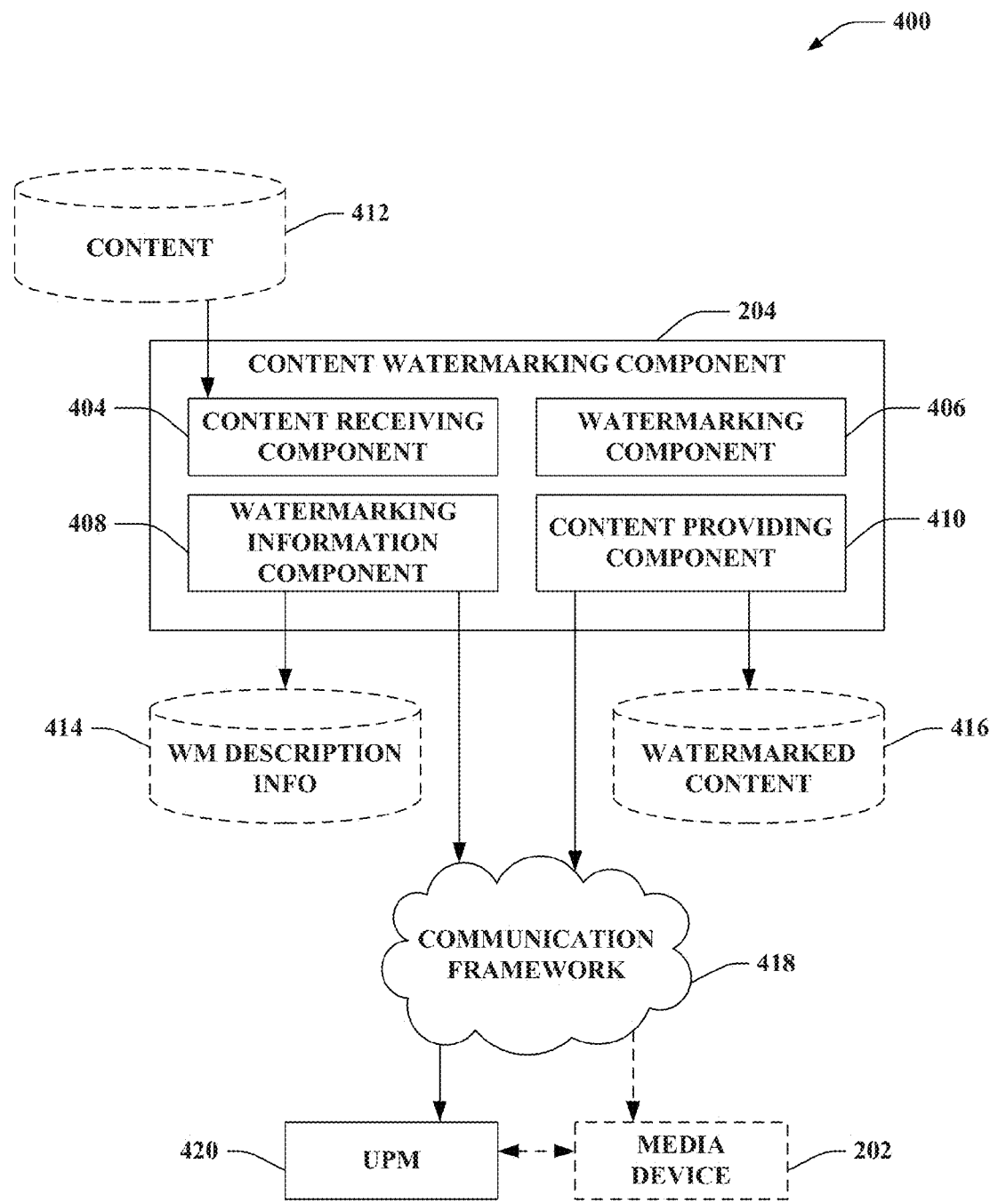
FIG. 4 is an aspect of an example system for watermarking content.

FIG. 4 illustrates an example system 400 for watermarking content for authentication by a secure device in rendering or executing the content. System 400 includes a content watermarking component 204 for watermarking content and generating related watermarking description information. Content watermarking component 204 can include a content receiving component 404 for obtaining content for watermarking. Content watermarking component 204 can also include a watermarking component 406 for generating watermarking information and embedding the watermarking information in the content. Content watermarking component 204 can further include a watermarking information component 408 for generating and providing watermarking description information describing the location(s) of the watermarking information in the content, information regarding values to expect at the location(s) in the content, etc. Content watermarking component 204 also includes a content providing component 410 for providing the watermarked content to a device, database, etc.

According to an example, content receiving component 404 receives content 412 for watermarking. This can include receiving the content 412 upon request or otherwise. In addition, content 412 can be stored at a remotely located source, in an example. Content 412 can include video content (e.g., AVI, MPEG, etc.), audio content, or other content that can be rendered on a display or other output device. Watermarking component 406 can generate watermarking information, such as a digital signature identifying a source of the content or other cryptographic information that can be used to verify authenticity of the content.

Watermarking component 406 can embed the watermarking information in the content. For example, this can include replacing portions of the content with the watermarking information, such as pixels within one or more video frames, sound values in an audio stream, etc. It is to be appreciated that when the content type is comprised, such as MPEG, the watermarking information can be embedded in the compressed data, as described herein. Watermarking information component 408 can generate watermarking description information that specifies the location(s) of the watermarking information within the content (e.g., which can include additional or alternative information for locating the watermarking information in a specific content format, such as location within compressed MPEG content). The watermarking description information can also specify watermarking values to be expected in the content (e.g., values indicative of the digital signature or other identifier for authenticating the content as being from the source).

Watermarking information component 408 can provide the watermarking description information to a WM description info database 414 (e.g., for obtaining by a secure device), and/or can transmit the watermarking description information directly to a secure device (e.g., UPM 420) via communication framework 418. Thus, the secure device can be remotely located, in one example. In any case, for example, watermarking information component 408 can provide the watermarking description information as encrypted data to ensure authorized entities are able to receive and process the information. For example, watermarking information component 408 can establish a secure connection with UPM 420 over communication framework 418 by using an encrypted communication link. Thus, content watermarking component 204 can be or can include a secure server functionality. In other examples, watermarking information component 408 can store the watermarking description information as encrypted in WM description info database 414.

Content providing component 410 can provide the watermarked content to a watermarked content database 416 and/or to UPM 420, a media device 202, or other device via communication framework 418. In an example, media device 202 can communicate with UPM 420 to render the watermarked content, and UPM 420 can verify authenticity of the content during rendering by obtaining the watermarking information from the watermarked content based on the watermarking description information, as described. For example, UPM 420 can provide the functionality of secure device 102, though it is to be appreciated that the UPM 420 can also receive and render the watermarked content 416 from the content watermarking component 204 and/or watermarked content database 416 directly.

In another example, content watermarking component 204 can be a secure server hosted by a manufacturer of the UPM 420 and/or of a related device within which the UPM 420 is installed (e.g., a fuel dispenser, vending machine, or other retail device). The server can include a hardware security module (HSM) with encryption keys for one or more (or all) UPMs 420 deployed by the manufacturer. In this regard, watermarking component 406 can generate the watermarking information using encryption keys for all or a specific UPM 402. In this example, watermarking information component 408 can send related watermarking description information to the specific UPM and/or content providing component 410 can forward the watermarked content to the specific UPM or related media device.

Figure 5:
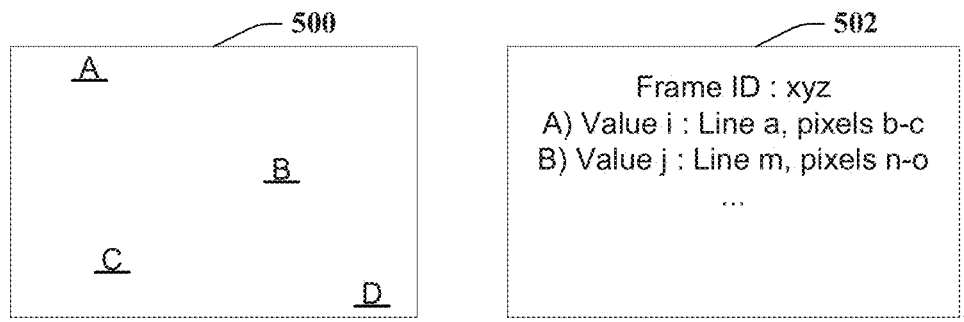
FIG. 5 is an aspect of example content that includes watermarking information embedded within the content and related description information.

FIG. 5 illustrates an example video frame 500 with embedded watermarking information, and related watermarking description information 502 for locating and/or verifying the watermarking information. Video frame 500, in this example, includes a plurality of pixel collections A, B, C, and D that can be modified in the video frame 500 to include values related to the watermarking information. These pixel collections can be rendered in the video frame 500, in an example, canceled out, and/or the like. As described herein, a secure device can obtain the watermarking description information 502 associated with the watermarked content, and can extract the pixel collections A, B, C, and D from video frame 500 while rendering the video content.

For example, based on the watermarking description information 502, a secure device can determine that a portion (e.g., value i) of the watermarking information can be found in frame xyz, at line a, pixels b-c, and an additional portion (e.g., value j) at line m, pixels n-o. The secure device can accordingly obtain the values and attempt to authenticate the watermarking information. In one example, the secure device can verify the values i, j, etc. against values received in the watermarking description information. In another example, the values i, j, etc., when combined (e.g., concatenated or otherwise) can form a digital signature that can be authenticated.

Moreover, for example, the watermarking information can appear within a first number of frames to ensure the information is obtained before an authentication timeout or otherwise before the content is fully rendered.

Figure 6:
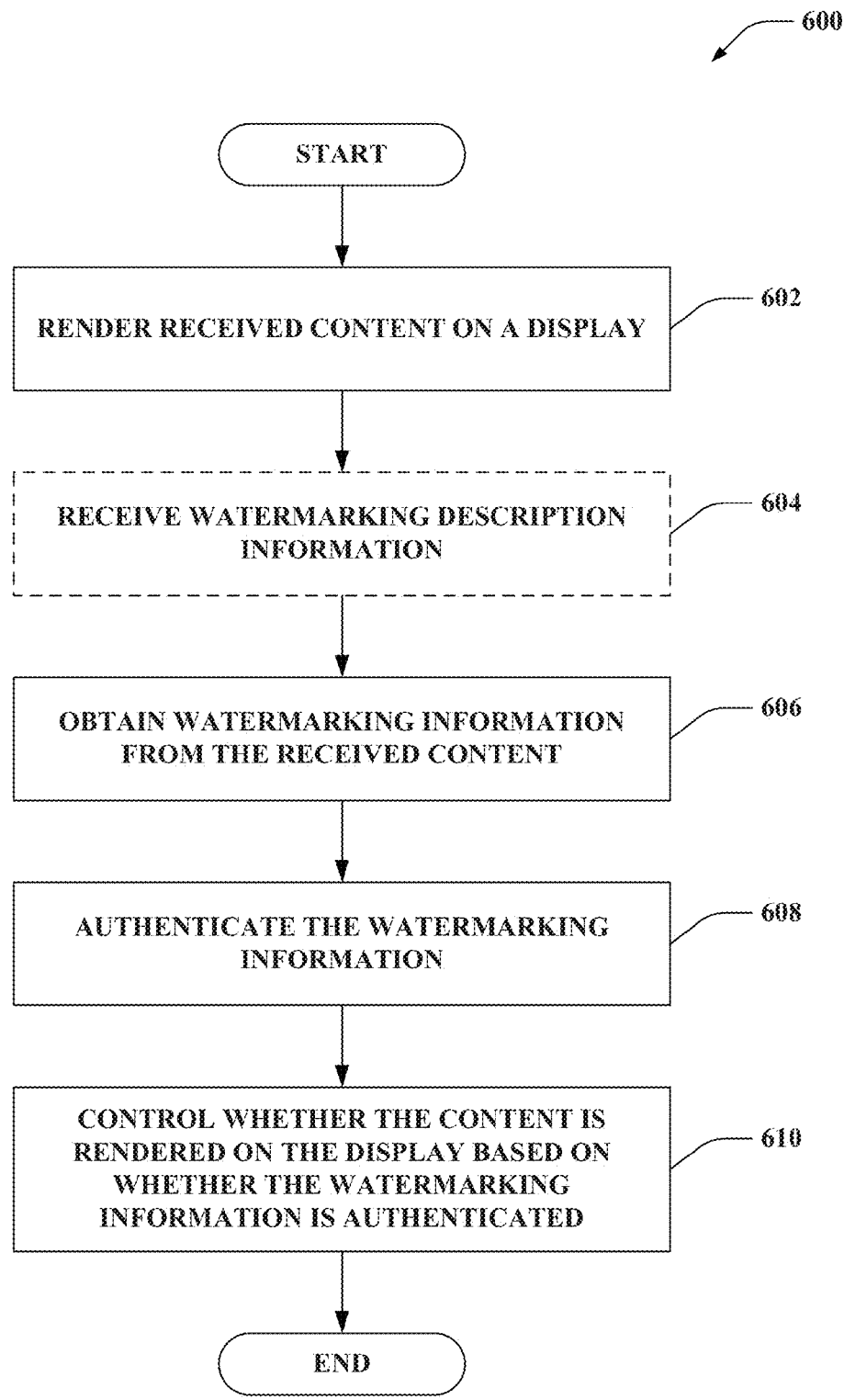
FIG. 6 is an aspect of an example methodology for controlling rendering of content based on verifying authenticity thereof.
Figure 7:
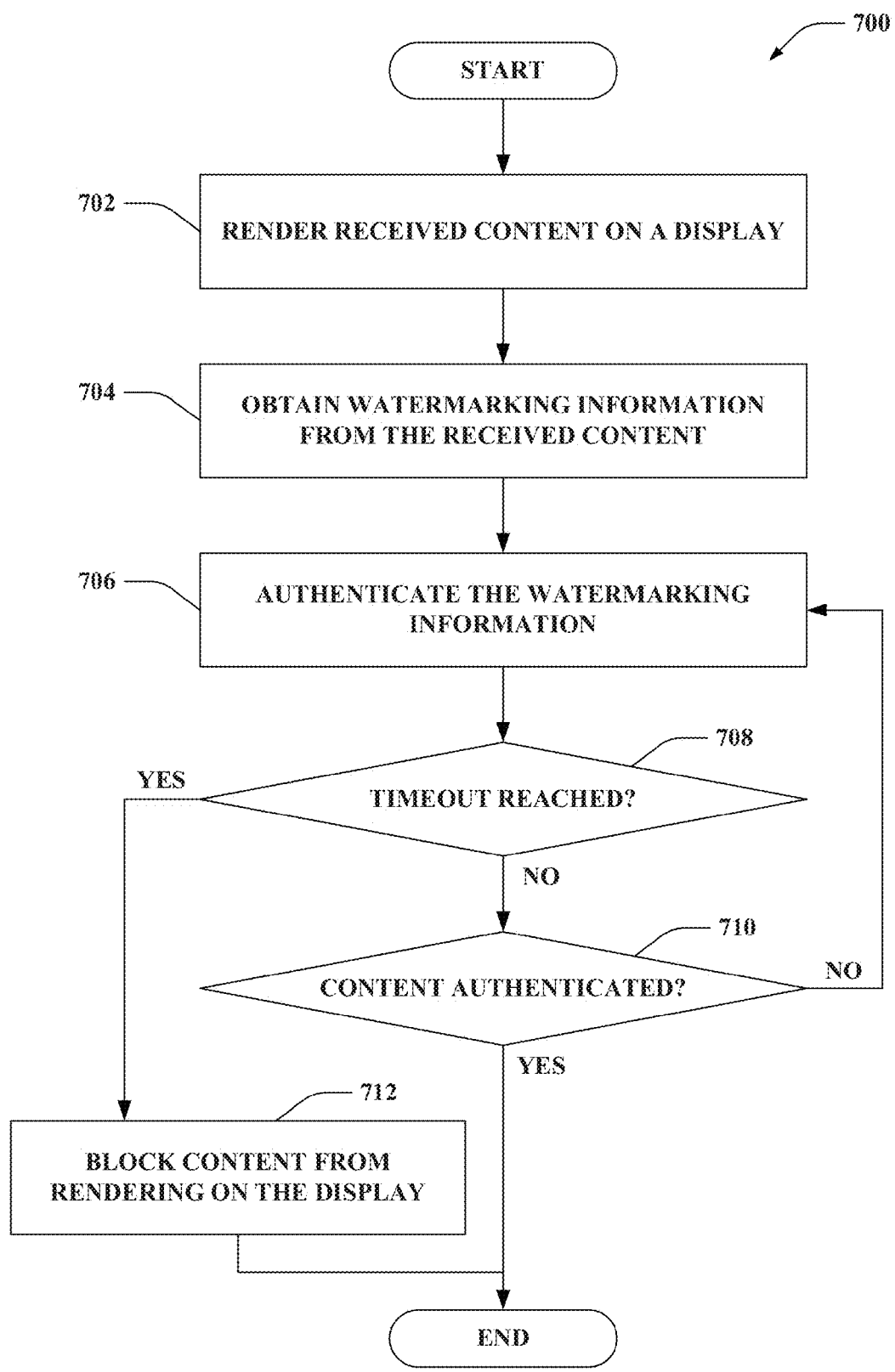
FIG. 7 is an aspect of an example methodology for blocking content that cannot be authenticated from rendering on a display.
Figure 8:
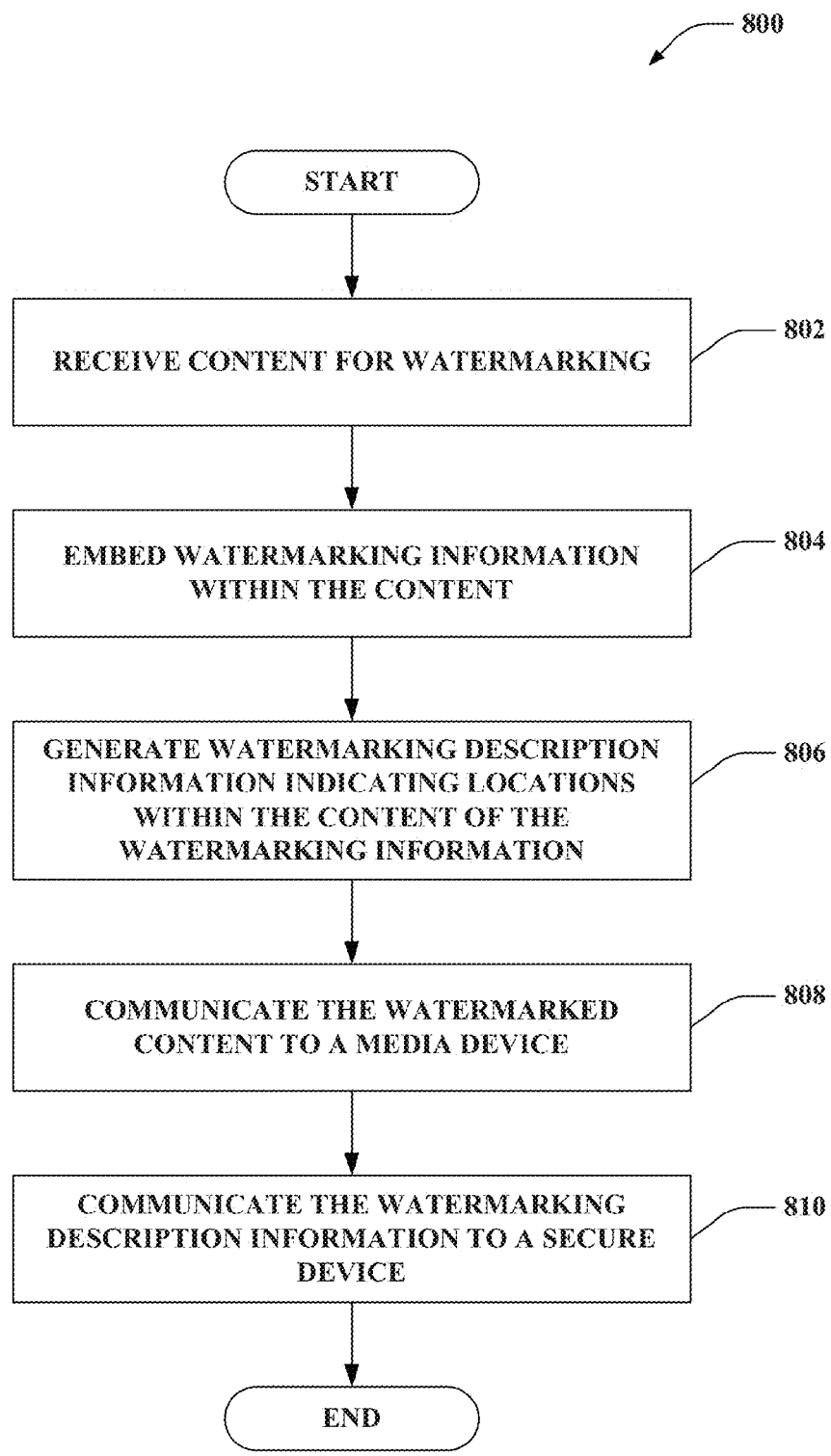
FIG. 8 is an aspect of an example methodology for watermarking content.

Referring to FIGS. 6-8, methodologies that can be utilized in accordance with various aspects described herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 6 illustrates an example methodology 600 for controlling rendering of watermarked content based on authenticating watermarking information. At 602, received content can be rendered on a display. As described, the content can be received from a media device and can include watermarking information for authenticating the content. The content can begin rendering during the authentication process.

At 604, watermarking description information is optionally received. For example, this information can be received over a secure link with a server at a manufacturer of a secure device, etc. The watermarking description information can describe locations, expected values, etc. of watermarking information embedded in the content.

At 606, watermarking information can be obtained from the received content. For example, this can include locating the watermarking information based at least in part on the received watermarking description information. In other examples, information for locating the watermarking information can be known or otherwise preprogrammed by a manufacturer. As described, for example, where the content is video, the watermarking information can be embedded in pixels of frames such that pixel values of the video within the frames are replaced with watermarking information values. Thus, at 606, the watermarking information is extracted from the pixels as indicated by the watermarking description information or otherwise known.

At 608, the watermarking information is authenticated. As described, this can include comparing values in the watermarking information with expected values (which can be specified within watermarking description information or otherwise known). In another example, authenticating the watermarking information can include verifying a signature generated from the watermarking information. It is to be appreciated that authenticating the watermarking information at 608 can include substantially any form of verifying the watermarking information with known values, values derived from the watermarking information, or substantially any sort of authentication (e.g., challenge-response, challenge handshake, message authentication code (MAC), etc.).

At 610, whether content is rendered on the display can be controlled based on whether the watermarking information is authenticated. For example, where the watermarking information is not authenticated, or is not done so within a certain time, the content can be terminated or otherwise blocked from the display. Where the content is authenticated, it can continue to be rendered on the display.

It is to be appreciated, however, that authentication of the content need not occur, and a device can render the content without authenticating. However, if authentication is needed or desired, the watermarking information within the content can be used in this regard to verify authenticity, and actions can be occur based on whether or not the content is authenticated.

FIG. 7 illustrates an example methodology 700 for controlling rendering of watermarked content based on authenticating watermarking information. At 702, received content can be rendered on a display. As described, the content can be received from a media device and can include watermarking information for authenticating the content. The content can begin rendering while authentication proceeds.

At 704, watermarking description information is optionally received. For example, this information can be received over a secure link with a server at a manufacturer of a secure device, etc. The watermarking description information can describe locations, expected values, etc. of watermarking information embedded in the content.

At 706, the watermarking information is authenticated. As described, this can include comparing values in the watermarking information with expected values, authenticating the watermarking information can include verifying a signature generated from the watermarking information, etc.

At 708, it can be determined whether a timeout is reached. In this example, the timeout can be related to a value specified for a period of time by which authentication must occur before the content is blocked. If the timeout has not been reached, it can be determined whether the content is authenticated at 710. As described, the content can be watermarked in various areas of the content, and thus not all watermarking information is received in the same time period (e.g., watermarking information can be spread across a number of frames in a video). Thus, if the content is not authentic at 710 (e.g., because enough watermarking information has not yet been received), the watermarking information can be authenticated again at 706 until the content is authenticated at 710, or until the timeout is reached at 708.

If the timeout is reached at 708 without the content being authenticated, the content can be blocked from rendering on the display at 712. If the content is authenticated at 710, the process ends and rendering of the content on the display is not disrupted.

FIG. 8 illustrates an example methodology 800 for watermarking content. At 802, content can be received for watermarking. For example, the content can be received based on a request or otherwise. At 804, watermarking information can be embedded within the content. For instance, the watermarking information can include one or more generated values that can be imposed on the content (e.g., as pixels replaced in one or more frames). The watermarking information can include values that can be used to generate a signature by a secure device obtaining the information.

At 806, watermarking description information can be generated indicating locations within the content of the watermarking information. As described, the watermarking description information can be generated to include frame and pixel locations within video content. Moreover, the watermarking description information may include values of the watermarking information for verifying by a secure device obtaining the information.

At 808, the watermarked content can be communicated to a media device. The media device can render the watermarked content to a display (e.g., via a secure device or otherwise), as described.

At 810, the watermarking description information can be communicated to a secure device. For example, the watermarking description information can be encrypted to secure the information for communicating to the secure device, which can decrypt the watermarking description information. Moreover, in an example, a secure link can be established with the secure device for communicating the watermarking description information with the secure device.

Figure 9:
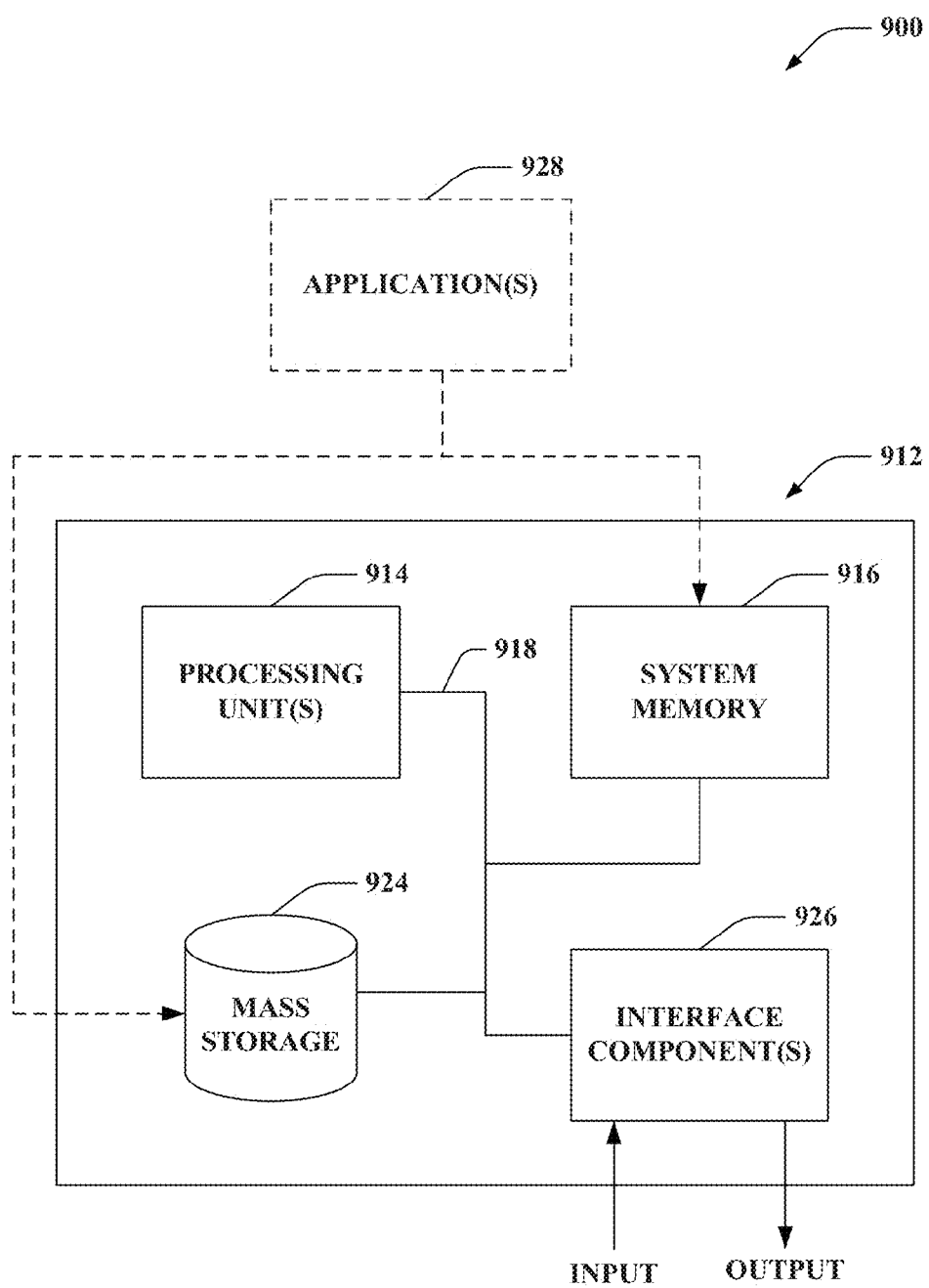
FIG. 9 is an aspect of an example system in accordance with aspects described herein.
Figure 10:
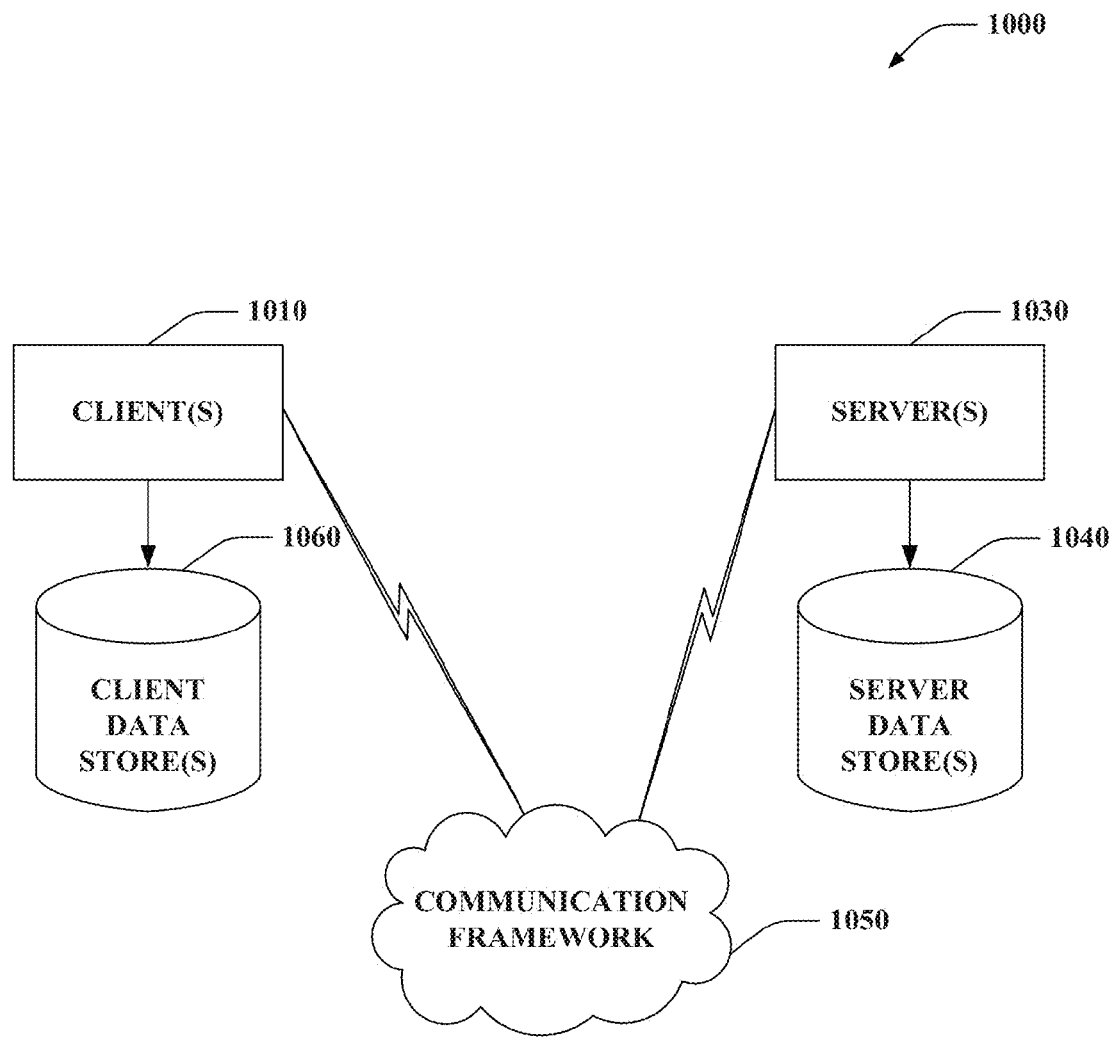
FIG. 10 is an aspect of an example communication environment in accordance with aspects described herein.

To provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., cathode ray tube (CRT), liquid crystal display (LCD), light emitting diode (LED), plasma . . . ), speakers, printers and other computers, among other things.

According to an example, the processing unit(s) 914 can comprise or receive instructions related to rendering water-marked content, obtaining and authenticating watermarking information, embedding watermarking information within the content, communicating the watermarked content and/or related watermarking description information, etc., and/or other aspects described herein. It is to be appreciated that the system memory 916 can additionally or alternatively house such instructions and the processing unit(s) 914 can be utilized to process the instructions. Moreover, interface component(s) 926 can allow for interacting with content, operating certain functions of the devices described herein, etc., and mass storage 924 can store information for performing the certain functions, such as content, watermarking description information, signatures, keys, etc. System 900, or at least computer 912, can include a secure device 102, media device 104, content watermarking component 204, UPM 302, or other devices, components, or systems described herein, etc.

FIG. 10 is a schematic block diagram of a sample-computing environment 1000 with which the subject innovation can interact. The environment 1000 includes one or more client(s) 1010. The client(s) 1010 can be hardware and/or software (e.g., threads, processes, computing devices). The environment 1000 also includes one or more server(s) 1030. Thus, environment 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The environment 1000 includes a communication framework 1050 that can be employed to facilitate communications between the client(s) 1010 and the server(s) 1030. Here, the client(s) 1010 can correspond to program application components and the server(s) 1030 can provide the functionality of the interface and optionally the storage system, as previously described. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, one or more clients 1010 can be secure device 102, media device 104, UPM 302, etc. requesting content or related watermarking description information from server(s) 1030, which can include a content watermarking component 204 or other server that can store or access storage comprising content, watermarking description information, etc., via communication framework 1050. The server(s) 1030 can, in one example, communicating content, watermarking description information, etc. over a secure or non-secure link, as described, to the client(s) 1010 via communication framework 1050, which can store the content, watermarking description information, etc. in client data store(s) 1060.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise random access memory (RAM), read-only memory (ROM), electrically erasable programmable ROM (EEPROM), compact disc (CD)-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. A fuel dispenser for authenticating content for display, comprising: a display; a secure device coupled to the display configured to receive authentic watermarking information and control content rendered on the display; and a media device configured to obtain watermarked content for rendering on the display, wherein the watermarked content includes embedded watermarking information enabling authentication of the watermarked content but which does not comprise the watermarked content, wherein the secure device comprises a processor and a memory including computer program code, the memory and the computer program code configured to, with the processor, cause the secure device to: receive the watermarked content from the media device; render the watermarked content on the display; determine the watermarking information embedded in the watermarked content; allow the watermarked content; to be rendered on the display in response to authenticating the watermarking information with the authentic watermarking information; and block the watermarked content rendering to the display in response to a failure to authenticate the watermarking information with the authentic watermarking information, wherein the authentication of the watermarking information is determined as the content is rendered or executed, wherein the memory and the computer program code are further configured to: obtain watermarking description information for the content that indicates locations within the watermarked content including the watermarking information, and determine the watermarking information at least in part by extracting data from the locations within the watermarked content as the watermarked content is rendered on the display.

2. The fuel dispenser of claim 1, wherein the memory and the computer program code are further configured to extract the data from the locations within the watermarked content further based on a type of the content.

3. The fuel dispenser of claim 1, wherein the watermarked content is a video, and the locations correlate to a plurality of pixels in one or more frames in the video.

4. The fuel dispenser of claim 1, wherein the memory and the computer program code are further configured to receive the watermarking description information over a secure link.

5. The fuel dispenser of claim 4, wherein the memory and the computer program code are further configured to decrypt the watermarking description information as received over the secure link.

6. The fuel dispenser of claim 1, wherein the memory and the computer program code are further configured to authenticate the watermarking information based at least in part on comparing the watermarking information to expected values for the authentic watermarking information.

7. The fuel dispenser of claim 1, wherein the memory and the computer program code are further configured to authenticate the watermarking information based at least in part on authenticating a signature generated by the watermarking information.

8. The fuel dispenser of claim 1, wherein the memory and the computer program code are further configured to block the watermarked content from being rendered on the display where the secure device fails to successfully authenticate the watermarked content within a period of time.

9. The fuel dispenser of claim 1, further comprising: a feature connector configured to: switch a communication path between the secure device and the display, wherein the memory and the computer program code are further configured to control whether the watermarked content is rendered on the display by activating or deactivating the feature connector.

10. A system for generating watermarked content, comprising at least one processor and a memory including computer program code, the memory and the computer programming code configured to, with the processor, cause the system to: obtain content for watermarking; generate watermarking information for the content and embed the watermarking information within the content to generate watermarked content; generate watermarking description information indicating locations within the watermarked content of the watermarking information and communicate authentic watermarking information to a secure device; and communicate the watermarked content to a media device, wherein the watermarked content is a video, and the locations correlate to a plurality of pixels in one or more frames in the video that represent the watermarking information, said plurality of pixels each making up less than an entire frame, and wherein the watermarking information is configured to be authenticated as the content is rendered or executed to a display, such that the content is allowed to be rendered in response to authenticating the watermarking information with the authentic watermarking information and blocked from rendering in response to a failure to authenticate the watermarking information with the authentic watermarking information; wherein the memory and the computer program code are further configured to obtain watermarking description information for the content that indicates locations within the watermarked content including the watermarking information, and determine the watermarking information at least in part by extracting data from the locations within the watermarked content as the watermarked content is rendered on the display.

11. The system of claim 10, wherein the memory and the computer program code are further configured to communicate the watermarking description information to the secure device.

12. The system of claim 11, wherein the memory and the computer program code are further configured to communicate the watermarking description information to the secure device over a secure link.

13. The system of claim 11, wherein the memory and the computer program code are further configured to encrypt the watermarking description information for communicating to the secure device.

* * * * *